(12) United States Patent
Che et al.

(10) Patent No.: US 12,725,015 B2
(45) Date of Patent: Sep. 1, 2026

(54) RECONFIGURABLE PREDICTION ENGINE FOR GENERAL PROCESSOR COUNTING

(71) Applicant: Advanced Micro Devices, Inc., Santa Clara, CA (US)

(72) Inventors: Shuai Che, Bellevue, WA (US); Jieming Yin, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1258 days.

(21) Appl. No.: 15/922,875

(22) Filed: Mar. 15, 2018

(65) Prior Publication Data

US 2019/0286971 A1 Sep. 19, 2019

(51) Int. Cl.
*G06N 3/063* (2023.01)
*G06N 3/04* (2023.01)
*G06N 3/08* (2023.01)

(52) U.S. Cl.
CPC .............. *G06N 3/063* (2013.01); *G06N 3/04* (2013.01); *G06N 3/08* (2013.01)

(58) Field of Classification Search
CPC ........ G06N 3/063; G06N 3/04; G06N 3/0445; G06N 3/0454; G06N 3/08
See application file for complete search history.

(56) References Cited

U.S. PATENT DOCUMENTS

2017/0220942 A1* 8/2017 Baldini Soares ........ G06N 5/04
2018/0246762 A1* 8/2018 Tarsa .................... G06F 9/5083
2019/0213775 A1* 7/2019 Dimitrov ................ G06T 15/80

OTHER PUBLICATIONS

Gene, et al. "GPGPU performance and power estimation using machine learning." 2015 IEEE 21st international symposium on high performance computer architecture (H PCA). IEEE, (Year: 2015).*

Zheng, et al. "Integrating profile-driven parallelism detection and machine-learning-based mapping." ACM Transactions on Architecture and Code Optimization (TACO) 11.1 (Year: 2014).*

Song et al. "A simplified and accurate model of power-performance efficiency on emergent GPU architectures." 2013 IEEE 27th International Symposium on Parallel and Distributed Processing. IEEE, (Year: 2013).*

Cavazos, John etal., "Adaptive Prefetching using Neural Networks." Proposal to NEC (Year: 1997).*

(Continued)

*Primary Examiner* — Adam C Standke
(74) *Attorney, Agent, or Firm* — Volpe Koenig

(57) ABSTRACT

Systems, methods, and devices for determining a derived counter value based on a hardware performance counter. Example devices include input circuitry configured to input a hardware performance counter value; counter engine circuitry configured to determine the derived counter value by applying a model to the hardware performance counter value; and output circuitry configured to communicate the derived counter value to a consumer. In some examples, the consumer includes an operating system scheduler, a memory controller, a power manager, or a data prefetcher, or a cache controller. In some examples, the processor includes circuitry configured to dynamically change the model during operation of the processor. In some examples, the model includes or is generated by an artificial neural network (ANN).

48 Claims, 9 Drawing Sheets

(56) References Cited

OTHER PUBLICATIONS

Sayadi et al. "Machine learning-based approaches for energy-efficiency prediction and scheduling in composite cores architectures. "2017 IEEE International Conference on Computer Design (ICCD). IEEE, (Year: 2017).*
Cummins, et al. "End-to-end deep learning of optimization heuristics." 2017 26th International Conference on Parallel Architectures and Compilation Techniques (PACT). IEEE, (Year: 2017).*
Advanced Micro Devices, Inc., "CodeXL Quick Start Guide", Sep. 29, 2017, 66 pgs., Version 2.5, Revision 1 (Retrieved at: https://github.com/GPUOpen-Tools/CodeXL/releases on Mar. 14, 2018).
Goodfellow, I. et al., "Deep Learning", 802 pgs., MIT Press, 2016. (Retrieved at: http://www.deeplearningbook.org on Mar. 14, 2018).

* cited by examiner

Recurrent Neural Network

Other Models or User-defined Functions

RECONFIGURABLE PREDICTION ENGINE FOR GENERAL PROCESSOR COUNTING

BACKGROUND

A processor such as a central processing unit (CPU) or graphics processing unit (GPU), or a processor core, can include hardware counters to track various performance metrics. Hardware counters may be expensive to implement in terms of register usage, die area, or design effort. Accordingly, the number of available hardware performance counters on a given processor is limited.

BRIEF DESCRIPTION OF THE DRAWINGS

A more detailed understanding can be had from the following description, given by way of example in conjunction with the accompanying drawings wherein.

DETAILED DESCRIPTION

Figure 1:
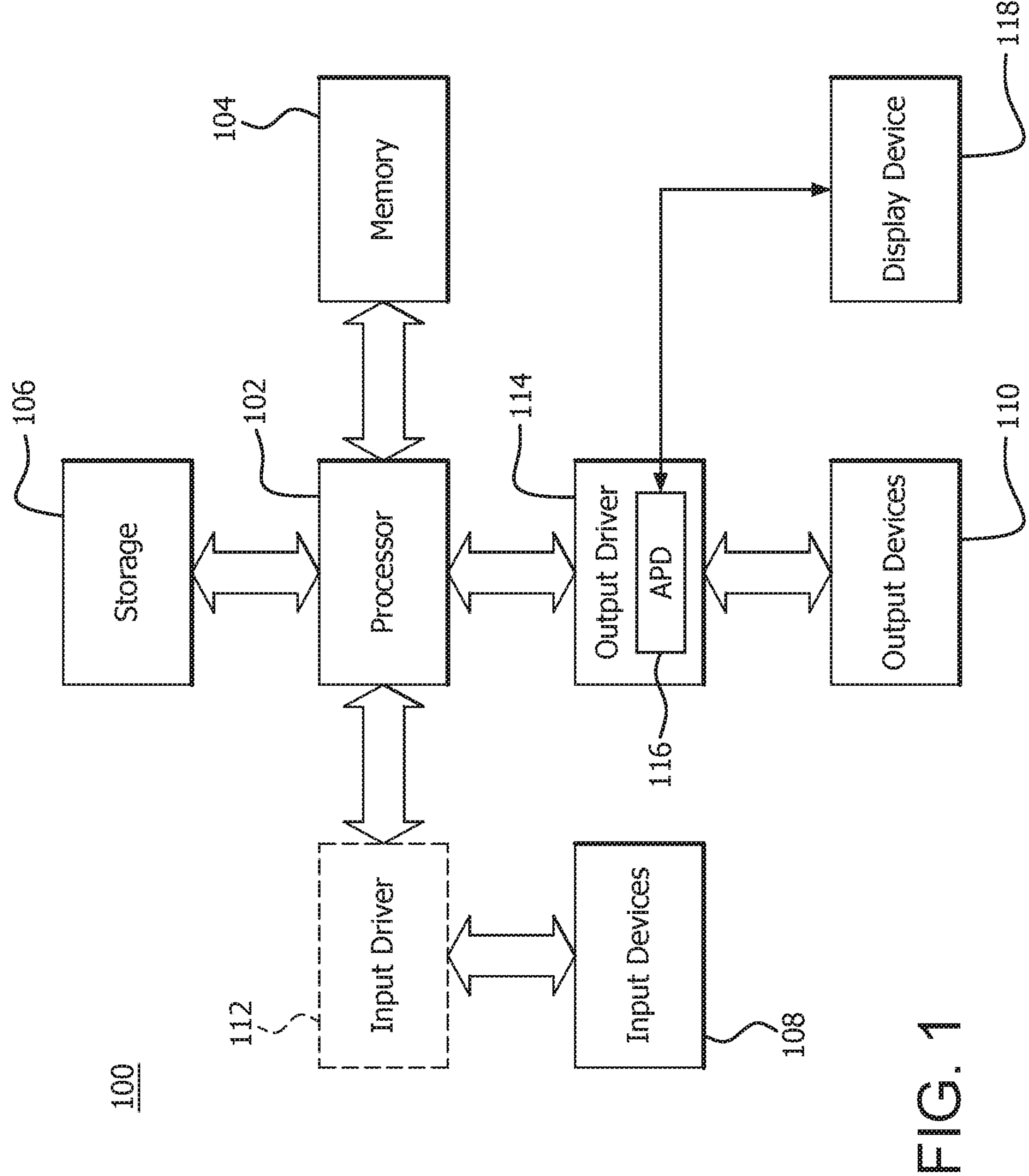
FIG. 1 is a block diagram of an example device in which one or more features of the disclosure can be implemented.

Some embodiments provide a processor configured to determine a derived counter value based on a hardware performance counter. The processor includes input circuitry configured to input a hardware performance counter value; counter engine circuitry configured to determine the derived counter value by applying a model to the hardware performance counter value; the counter engine circuitry including an artificial neural network (ANN) configured to dynamically modify the model based on the derived counter value; and output circuitry configured to communicate the derived counter value to a hardware control circuit.

In some embodiments, the hardware control circuit includes an operating system scheduler, a memory controller, a power manager, a data prefetcher, or a cache controller. In some embodiments, the processor includes circuitry configured to dynamically change the model during operation of the processor. In some embodiments, the model includes or is generated by an artificial neural network (ANN). In some embodiments, the ANN includes at least one of a convolutional neural network (CNN), a recurrent neural network (RNN), a fully connected neural network or a combination of a CNN, RNN, and/or fully connected neural network. In some embodiments, the model includes a user-defined function. In some embodiments, the derived counter value indicates a predicted execution time for a portion of a program executing on the processor. In some embodiments, the processor includes circuitry configured to determine whether to execute a portion of a program serially or in parallel based on the derived counter value. In some embodiments, the derived counter value indicates a predicted memory address, a predicted power requirement, or a predicted frequency requirement. In some embodiments, the processor includes circuitry configured to determine an address for a memory access based on the derived counter value. In some embodiments, the processor includes circuitry configured to manage power or frequency of the processor based on the derived counter value.

Some embodiments provide a prediction unit implemented on a processor core and configured to determine a derived counter value based on a hardware performance counter. The processor core includes input circuitry configured to input a hardware performance counter value; counter engine circuitry configured to determine the derived counter value based on applying a model to the hardware performance counter value; and output circuitry configured to communicate the derived counter value to a hardware control circuit.

In some embodiments, the derived counter value indicates application performance for a portion of a program executing on the processor. In some embodiments, the processor core includes circuitry configured to determine whether to execute a portion of a program serially or in parallel based on the derived counter value. In some embodiments, the derived counter value indicates a predicted memory address, a predicted power requirement, or a predicted frequency requirement. In some embodiments, the processor core includes circuitry configured to determine an address for a memory access based on the derived counter value. In some embodiments, the processor core includes circuitry configured to manage power or frequency of the processor based on the derived counter value.

Some embodiments provide a method for determining a derived counter value based on a hardware performance counter of a processor. The method includes inputting a hardware performance counter value to a counter engine; determining the derived counter value by applying a model to the hardware performance counter value using the counter engine; and communicating the derived counter value to a hardware control circuit.

In some embodiments, the derived counter value indicates a predicted execution time for a portion of a program executing on the processor. In some embodiments, the method includes determining whether to execute a portion of a program serially or in parallel based on the derived counter value. In some embodiments, the derived counter value indicates a predicted memory address, a predicted power requirement, or a predicted frequency requirement. In some embodiments, the method includes determining an address for a memory access based on the derived counter value. In some embodiments, the method includes determining a power or frequency of the processor based on the derived counter value.

Some embodiments provide instructions stored on a non-transitory computer-readable medium which when executed by a processor cause the processor to determine a derived counter value based on a hardware performance counter by inputting a hardware performance counter value to a counter engine; determining the derived counter value by applying a model to the hardware performance counter value using the counter engine; and communicating the derived counter value to a hardware control circuit.

Some embodiments include instructions for determining whether to execute a portion of a program serially or in parallel based on the derived counter value. In some embodiments, the derived counter value indicates a predicted memory address, a predicted power requirement, or a predicted frequency requirement. Some embodiments include instructions for determining an address for a memory access based on the derived counter value. Some embodiments include instructions for determining a power or frequency of the processor based on the derived counter value.

Some embodiments provide a system which includes a processor. The system includes input circuitry configured to input a hardware performance counter value from the processor; counter engine circuitry configured to determine a derived counter value based on applying a model to the hardware performance counter value; and output circuitry configured to communicate the derived counter value to a hardware control circuit of the processor.

In some embodiments, the hardware control circuit includes an operating system scheduler, a memory controller, a power manager, or a data prefetcher, or a cache controller. In some embodiments, the model includes or is generated by an artificial neural network (ANN). In some embodiments, the derived counter value indicates a predicted execution time for a portion of a program executing on the processor. In some embodiments, the derived counter value indicates a predicted memory address, a predicted power requirement, or a predicted frequency requirement. In some embodiments, the counter engine is disposed on the processor.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
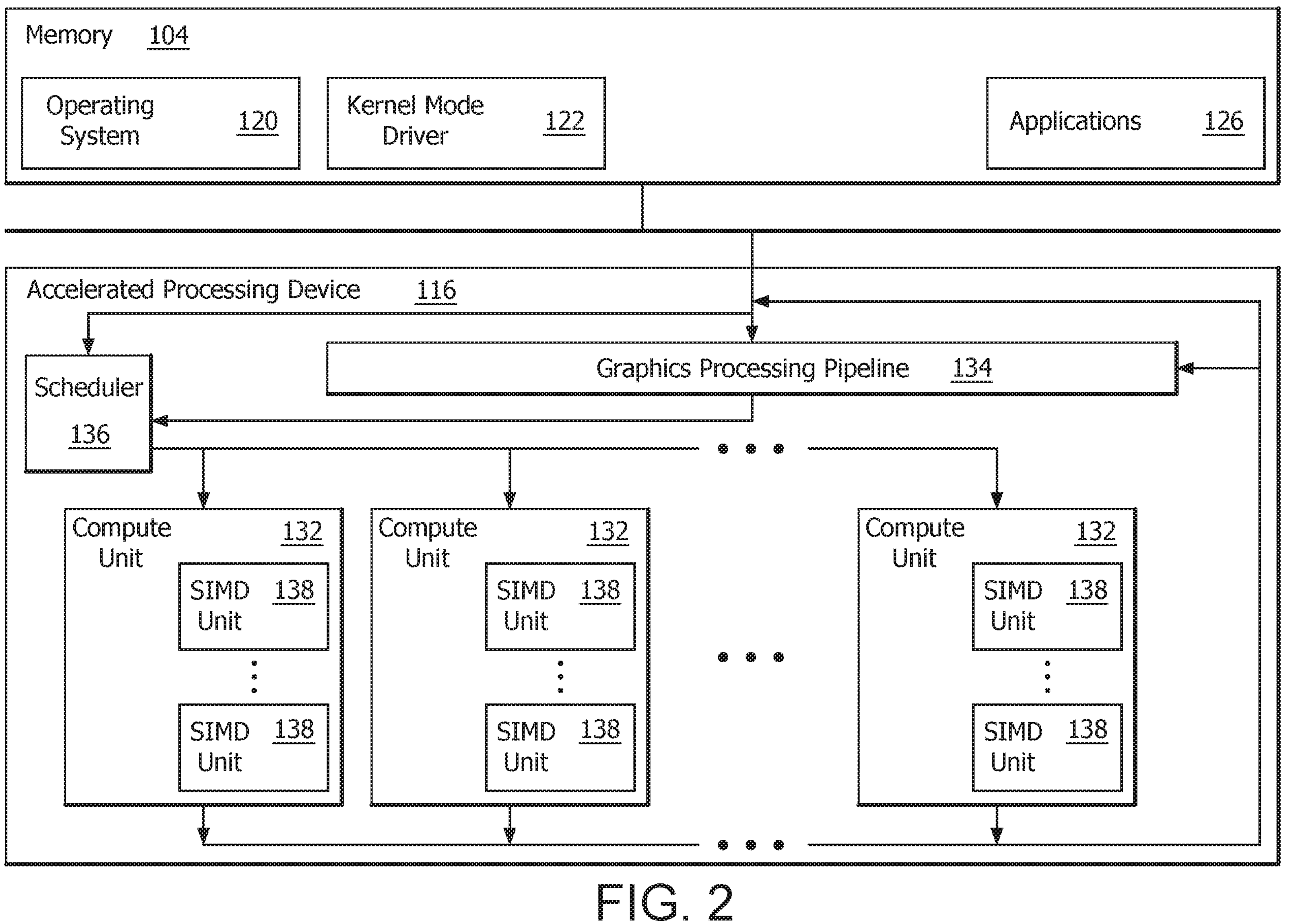
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Various processors (e.g., GPUs, CPUs, APUs, and the like) or processor cores can implement hardware counters, using any suitable circuitry. For example, processor 102 and/or APD 116, as shown and described with respect to FIG. 1 and FIG. 2, can implement one or more hardware counters. In APD 116, hardware counters can be implemented globally, (e.g., in registers accessible generally within APD 116), can be implemented in and accessible within one or more of compute units 132, can be implemented in and accessible within one or more of SIMD units 138, or can be implemented in any combination or permutation of these arrangements.

Hardware counters can include and can also be referred to as hardware performance counters, performance monitors, event counters, and the like. A processor (or processor core) can include hardware counters configured to count various activities, such as cycles (e.g., configured to increment every core cycle, or every 64 core cycles, etc.) or events (e.g., configured to track a number of instructions executed, cache misses, or mis-predicted branches, etc.). Hardware counters can be configured with a "tick rate". For example, rather than incrementing or counting once for every core cycle, a performance counter can be configured to increment or count once after every 64 core cycles, or at any other desired rate. Hardware counters can be implemented as or using registers (e.g., special purpose, or general purpose registers) within the processor, or can be implemented in a separate device in communication with the processor.

During development, a processor can be modeled using architecture simulator software. The number of performance counters which can be modeled by architecture simulator software can be arbitrary, depending upon computing resources available to the simulator, or the configuration of the simulator. Unlike processor models in software simulation however, processors realized in hardware can only implement a limited number of counters, e.g., due to the complexity and cost of hardware implementation. Once implemented, the number of hardware counters is fixed. Hardware counters are constrained, e.g., by die area, power, and timing requirements, etc. of the processor. Such limitations on the number of hardware counters that can be implemented may affect or prevent the realization of potential performance enhancements identified during architecture development and simulation in software, and limits the ability of programmers to instrument applications for evaluation and optimization of the efficiency of the applications running on the architecture. Accordingly, in order to realize the functional advantages of such potential performance enhancements, circuitry can be added to facilitate the processor to predict, derive, or otherwise generate various metrics that are not recorded by hardware performance counters. The predicted, derived, or otherwise generated values of such metrics can be referred to as derived counters.

It may be desired to predict or track metrics that are not implemented by hardware counters in order to help make hardware scheduling decisions. For instance, a processor may dynamically determine whether to serialize or parallelize a portion of a program (e.g., by single-thread or multi-thread execution). Based on the values of certain performance counters during serialized or parallelized execution of the program portion, the execution time can be predicted for serialized or parallelized execution of portions of the program. These predicted execution times can be provided to a hardware scheduler for performance tuning (e.g., to determine whether to serialize or parallelize different portions of the program). Some example counters, such as instructions per cycle, instruction fetch count, cache access count, busy count, and execution stall cycle count can be highly correlated with execution time for certain applications. Accordingly, given the measured values of hardware counters [X1, . . . Xn], (e.g., cache access count, cache miss rate, busy count, execution stall time, etc.) the values of derived counters/metrics [Y1 . . . Ym] (e.g., predicted execution time) can be predicted. The relationship between the input hardware counters and the output derived counters can be expressed functionally, for example, as [Y1 . . . Ym]=f([X1, . . . Xn]). Implementing derived counters in this way can facilitate prediction of execution times for more efficient hardware scheduling function.

In another example, it may be desired to track metrics that are not implemented by hardware counters for memory management purposes. For instance, such metrics can be used for predicting and prefetching memory blocks to load into the cache or pages to higher-level memories. Certain memory access patterns can be predictable based on memory traces. Accordingly, the values of a memory trace hardware performance counter may be input to a prediction engine in order to generate a derived counter having a value indicating a predicted next memory address, paging address, block address, or the like. Values of such derived counters can be provided to a memory controller, for example, which can provide an improvement in memory block prefetching function.

In a further example, it may be desired to track metrics that are not implemented by hardware counters for power management. Power management, such as dynamic voltage scaling (DVS), dynamic frequency scaling (DFS), or dynamic voltage and frequency scaling (DVFS), may be performed by collecting sensor and performance counters and making power management decisions using various algorithms. Such algorithms may be predefined or implemented in hardware or firmware. Hardware performance counters correlated with power management may include, for example, cache misses, branch predictions, clock cycles, processor utilization, and so forth. Sensor information correlated with power management may include, for example, temperature sensor information (e.g., temperature in centigrade or Fahrenheit, raw sensor data, etc.). Power management adjustments may be improved by predicting derived hardware counters based on these hardware performance counters and/or sensor information. For example, such derived hardware counters may reflect future events, application performance (e.g., predicted execution time, instructions per cycle, etc.), hardware utilization of system components, predicted power requirements, or predicted frequency requirements, e.g., as predicted by a machine learning algorithm based on the hardware performance counters and/or sensor data. The values of such derived counters can be provided to a power management controller, for example, in order to improve power management function.

Figure 3:
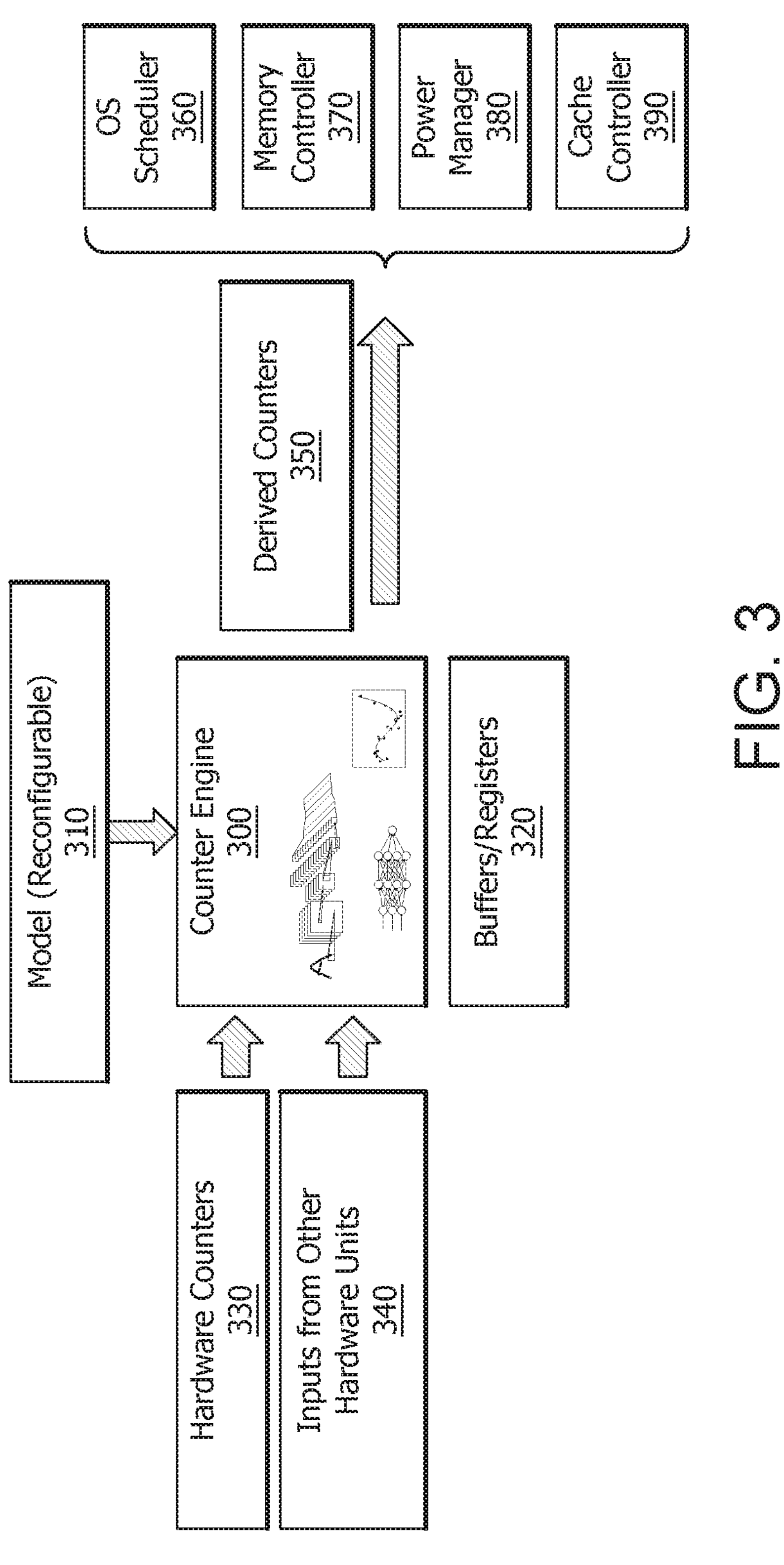
FIG. 3 is a system diagram illustrating an example counter engine.

FIG. 3 is a system diagram illustrating an example counter engine 300. Counter engine 300 operates to predict, derive, or otherwise generate one or more derived counters 350 for a processor. For example, counter engine 300 could be implemented in APD 116, compute units 132, and/or SIMD units 138 as shown and described with respect to FIGS. 1 and 2, or in any other suitable processing device, to input hardware counters and predict, derive, or otherwise generate derived counters relating to APD 116, compute units 132, and/or SIMD units 138. Counter engine 300 could also be implemented in a separate device on APD 116 connected to compute units 132 and/or SIMD units 138 to input hardware counters and predict, derive, or otherwise generate derived counters relating to APD 116, compute units 132, and/or SIMD units 138. Counter engine 300 could also be implemented by or on processor 102 to input hardware counters and predict, derive, or otherwise generate derived counters relating to APD 116, compute units 132, and/or SIMD units 138, or processor 102. Counter engine 300 could also be implemented as or on a separate device (not shown) within example device 100 which is in communication with processor 102 and/or APD 116 (e.g., via a bus or other communications structure) to input hardware counters and predict, derive, or otherwise generate derived counters relating to processor 102, APD 116, compute units 132, and/or SIMD units 138.

Counter engine 300 includes a model 310 for predicting, deriving, or generating derived counters, and includes or can access various buffers and/or registers 320. Model 310 can include any suitable model or models for predicting, deriving, or generating derived counters 350. In some examples, model 310 includes an artificial neural network (ANN), such as a fully connected neural network, convolutional neural network (CNN), recurrent neural network (RNN) or other neural network or combination or neural networks. Using an ANN, derived counters 350 can be predicted, e.g., based on a single input sample from input hardware counters 330 and/or inputs 340, or a time series of input data collected over a window of time from input hardware counters 330 and/or inputs 340. In some examples, model 310 includes a simple linear or nonlinear relationship, direct mapping, scaling factor, statistical model, algorithm, or any combination of possible models. In general, any relationship or combination of relationships suitable for predicting or generating derived counters 350 can be included in model 310. In some examples, model 310 can be replaced, augmented, modified, or updated, for example, via a firmware update, or dynamically using machine learning circuitry or circuitry implementing algorithms for selecting a new model from stored models, or by a programmer via an appropriate application programming interface (API), or for otherwise replacing, augmenting, modifying, or updating the current model 310.

Buffers and/or registers 320 are accessed by counter engine 300 to store and retrieve values of derived counters 350 and information for generating derived counters 350, such as values of hardware counters 330, inputs 340, intermediate values for calculations, and/or model 310, and can include any suitable buffers or registers. For example, if processor 102 implements the counter engine 300, buffers and/or registers 320 can include a subset of buffers or registers from a general register file of processor 102, or can include private and/or purpose-specific registers or buffers implemented on processor 102. If counter engine 300 is implemented by or on APD 116, buffers and/or registers 320 can include a subset of registers from a general register file of APD 116, registers or buffers from compute units 132 and/or SIMD units 138, private and/or purpose specific registers or buffers implemented on APD 116, or any other suitable structures. Buffers and/or registers 320 can store values of input hardware counters 330, output derived counters 350, model 310 or parts thereof, and/or any other information useable predicting, deriving, or otherwise generating output derived counters 350 based on input hardware counters 330.

Input hardware counters 330 include performance counters implemented in hardware which are useable by counter engine 300 to predict, derive, or otherwise output derived counters 350 using model 310. Input hardware counters 330 can include any suitable hardware counter or counters. Examples include counters for processor utilization, memory address, paging address, block address, cache misses, cycles per instruction, memory read/write bandwidth, instructions per cycle, etc. Inputs 340 include data input from sources other than hardware counters. For example, inputs 340 can include temperature, voltage, or current readings.

Derived counters 350 can include any suitable predicted, derived, or otherwise generated counter value or metrics that are not directly tracked by a hardware counter. Examples include predicted processor utilization, predicted memory address, predicted paging address, predicted block address, predicted voltage, predicted frequency, predicted cache misses, predicted cycles per instruction, predicted power consumption, and predicted energy consumption. Derived counters 350 are output to one or more hardware controllers or other consumers of this information. Such hardware controller can include, for example, an operating system scheduler 360, memory controller 370, power manager 380, or cache controller 390. Generating and providing derived counters 350 to hardware controllers can functionally improve the hardware scheduler by, e.g., increasing the accuracy, precision, and/or efficiency of the hardware controllers.

Figure 4:
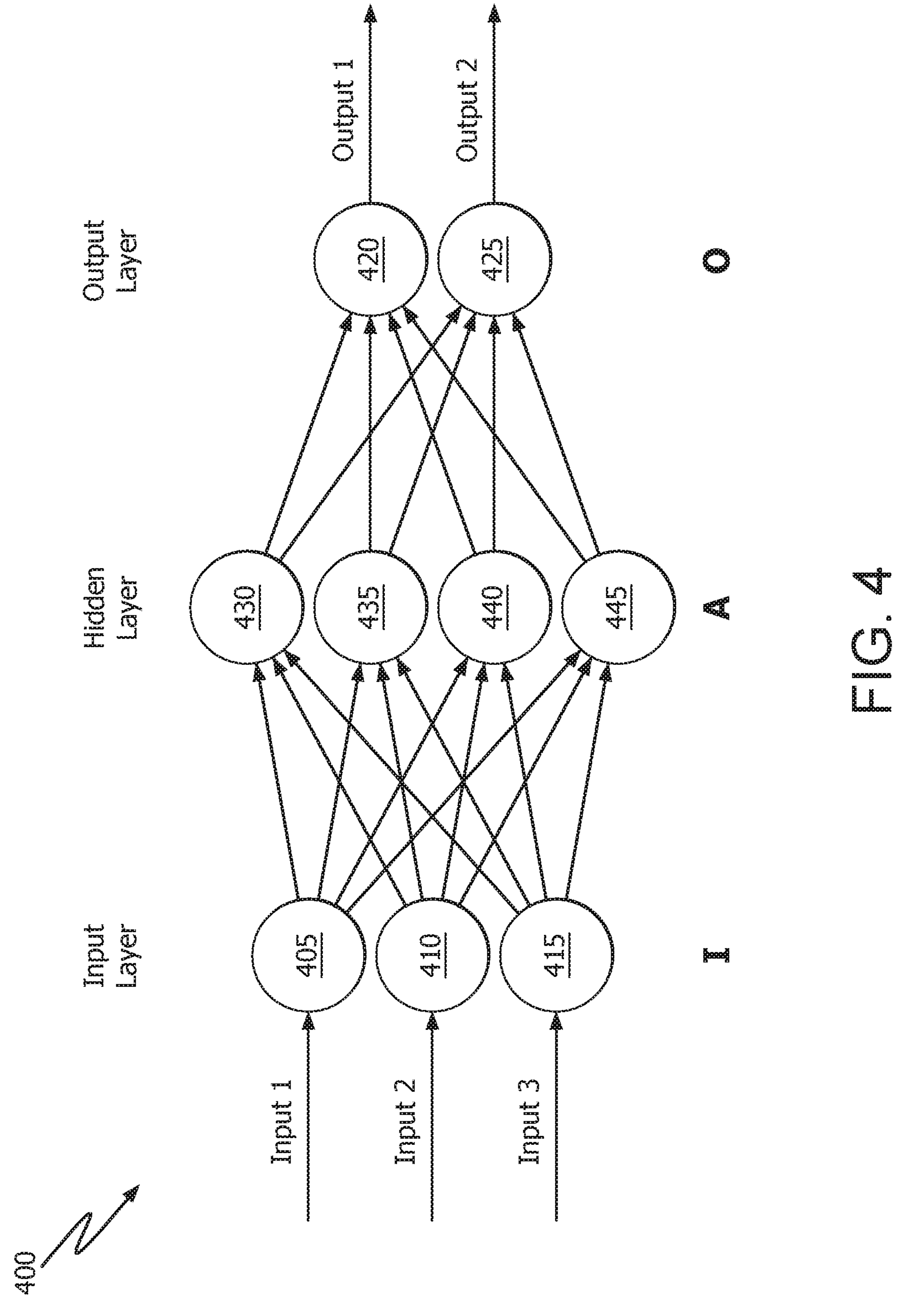
FIG. 4 is a schematic diagram illustrating an example artificial neural network (ANN) which can be used as a model for the counter engine of FIG. 3.

FIG. 4 is a schematic diagram illustrating an example ANN 400.

ANN 400 is a fully connected ANN which exemplifies a type of model which can be used to predict derived counters. For example, model 310 as shown and described with respect to FIG. 3 could include a fully connected ANN similar to ANN 400. ANN 400 includes a plurality of nodes such as input nodes 405, 410, 415, output nodes 420, 425, and hidden nodes 430, 435, 440, 445.

Example ANN 400 is organized into layers, including an input layer I, an output layer O, and a hidden (i.e., not input or output) layer A. Input layer I includes input nodes 405, 410, 415. Output layer O includes output nodes 420, 425. Hidden layer A includes hidden nodes 430, 435, 440, 445. In this context, describing a node or layer as hidden means that it is both input to and output from only by other nodes of the ANN, unlike input nodes and output nodes, which have a regular input or output interface with components outside of the ANN. A layer which outputs to or inputs from another layer can be described as logically adjacent to that layer. For example, in ANN 400, hidden layer A can be described as logically adjacent to input layer I and to output layer O. Logical adjacency in this context neither requires nor excludes physical adjacency.

The input, output, and hidden layers are interconnected by various links as shown in FIG. 4. In the example of ANN 400 each node shares a link with each node in its logically adjacent layers. The topology of ANN 400 is only one example, and it is noted that an ANN can be arranged in any suitable topology. For example, an ANN may instead include a different number of hidden layers, different numbers of input and/or output nodes, and/or different numbers and/or arrangements of links. ANN 400 is shown as having only one hidden layer, however the techniques described herein can also be applied to deep neural networks (i.e., having more than one hidden layer). It is noted that in other ANNs, each node need not share a link with each node in its logically adjacent layers.

Each of the hidden nodes of ANN 400 receives data from one or more preceding (i.e., closer to the input layer) nodes in a logically adjacent layer via a link, and outputs data to one or more succeeding (i.e., closer to the output layer) nodes in a logically adjacent layer via a link. For example, hidden node 430 inputs data from each of input nodes 405, 410, 415 via corresponding links, and outputs data to each of output nodes 420, 425 via corresponding links.

Each node processes its input data according to a function, which can be referred to as an activation function of the node. Each of the links is associated with a weight by which the data passing over that link is weighted (e.g., multiplied) before it is input to the activation function. For example, the data input to hidden node 430 is weighted according to the link weight of each corresponding input link from input nodes 405, 410, 415. Thus, if the link weight of the link from input node 405 is other than 1, the data will be modified based on the link weight before it is processed by the activation function of hidden node 430. If the link weight of the link from input node 410 differs from the link weight of the link from input node 405, the data from each of the input nodes will be weighted differently before it is processed by the activation function of hidden node 430. Similarly, the data output from hidden node 430 to each of output nodes 420, 425 of output layer O is weighted according to each corresponding output link.

Hidden node 430 processes the data input from input nodes 405, 410, 415, as weighted by the corresponding link weights, according to its activation function to generate output data. This output data from hidden node 430 is in turn input by output nodes 420, 425 of output layer O, as weighted by the link weights associated with the corresponding links. Based on the activation functions of each of the nodes and the link weights of each of the links in ANN 400, an output is generated at output nodes 420, 425 based on data input to input nodes 405, 410, 415.

The nodes of ANN 400 can be implemented on any suitable processing device or devices, such as APD 116 as shown and described with respect to FIGS. 1 and 2. For example, all layers of ANN 400 can be implemented on a single compute unit 132 of APD 116. Alternatively, each layer can be implemented on a different compute unit 132 of APD 116, or subsets of layers of ANN 400 can be implemented on different compute units 132 of APD 116. Compute units 132 are shown as incorporating various SIMD units 138, however it is noted that other kinds of compute units, e.g., which do not incorporate SIMD units, may be used in other implementations.

ANN 400 can be trained in any suitable way. In this example, ANN 400 is trained by inputting a training data set to the input layer I, and comparing the resulting output at the output layer O with a known correct output for the training data set. The difference between the output generated by ANN 400 and the known correct output is quantified or otherwise characterized (e.g., using a cost function), and the difference is known as the training loss. This difference is used to adjust the ANN. Such adjustments include altering link weights of one or more of the links. It is noted that in other examples, other kinds of adjustments may be performed, such as altering activation functions of one or more of the nodes. The training process iterates until the difference, i.e., the training loss is acceptably reduced (e.g., below a threshold). Each iteration of such training can be referred to as an epoch. This particular type of training can be referred to as back propagation training. Back propagation training is only one example way in which ANN 400 can be trained. Any suitable training techniques may be used to train ANN 400.

Figure 5:
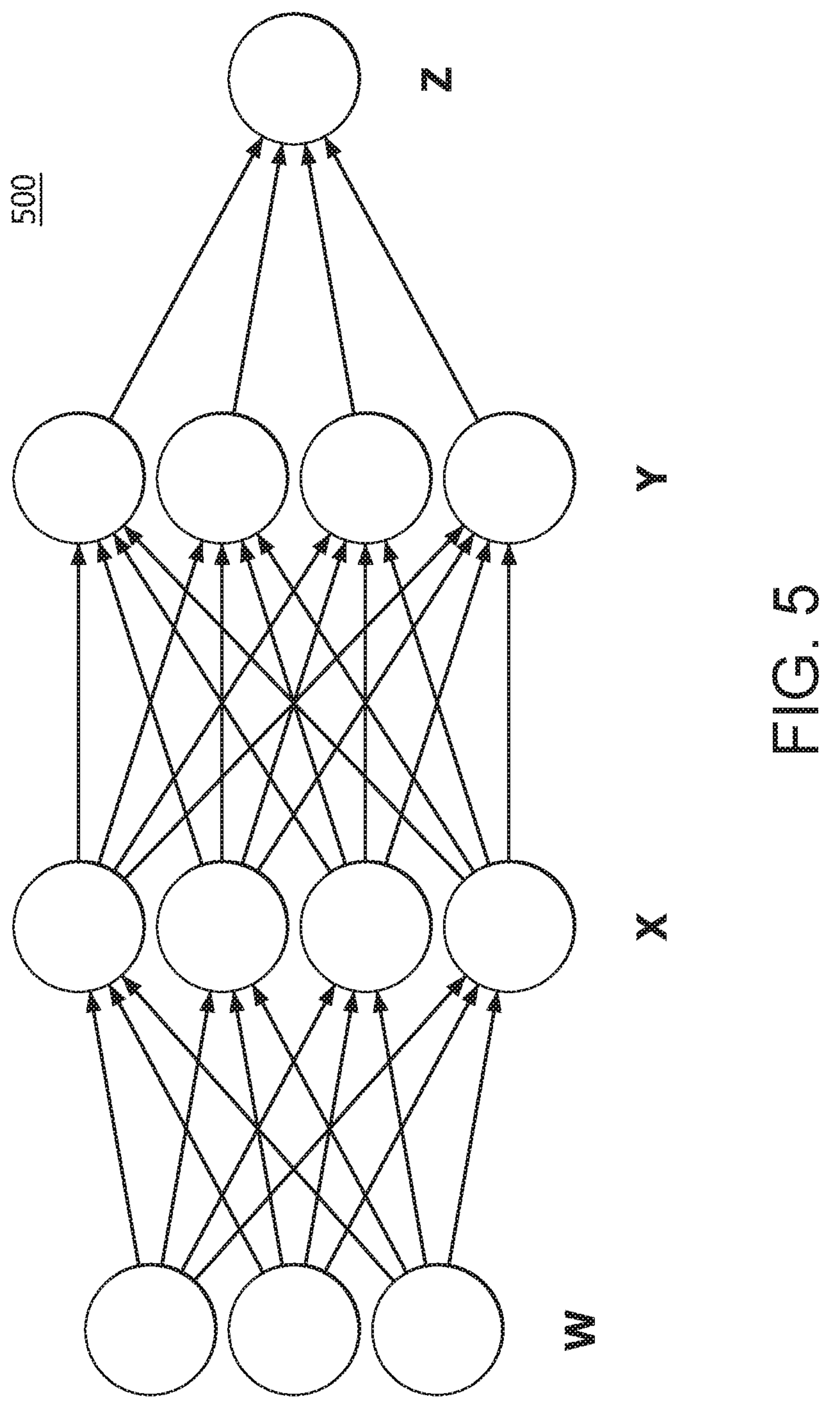
FIG. 5 is a schematic diagram illustrating another example ANN which can be used as a model for the counter engine of FIG. 3.

FIG. 5 is a schematic diagram illustrating another example ANN 500. ANN 500 includes an input layer W, output layer Z, and hidden layers X and Y. ANN 500 is a fully connected ANN similar to ANN 500 shown and described with respect to FIG. 4, except in that it includes two hidden layers X and Y, and output layer Z includes a single node. ANN 500 also exemplifies a type of model which can be used to predict derived counters. For example, model 310 as shown and described with respect to FIG. 3 could include a fully connected ANN similar to ANN 500 as shown and described with respect to FIG. 5. As exemplified by ANN 400 and ANN 500, it is noted that counter engine 300 shown and described with respect to FIG. 3 can include an ANN having any suitable combination of nodes and layers. It is also noted that the nodes and layers may be implemented on the same hardware device (e.g., CPU, GPU, core, and the like) or may be implemented on different devices.

Figure 6:
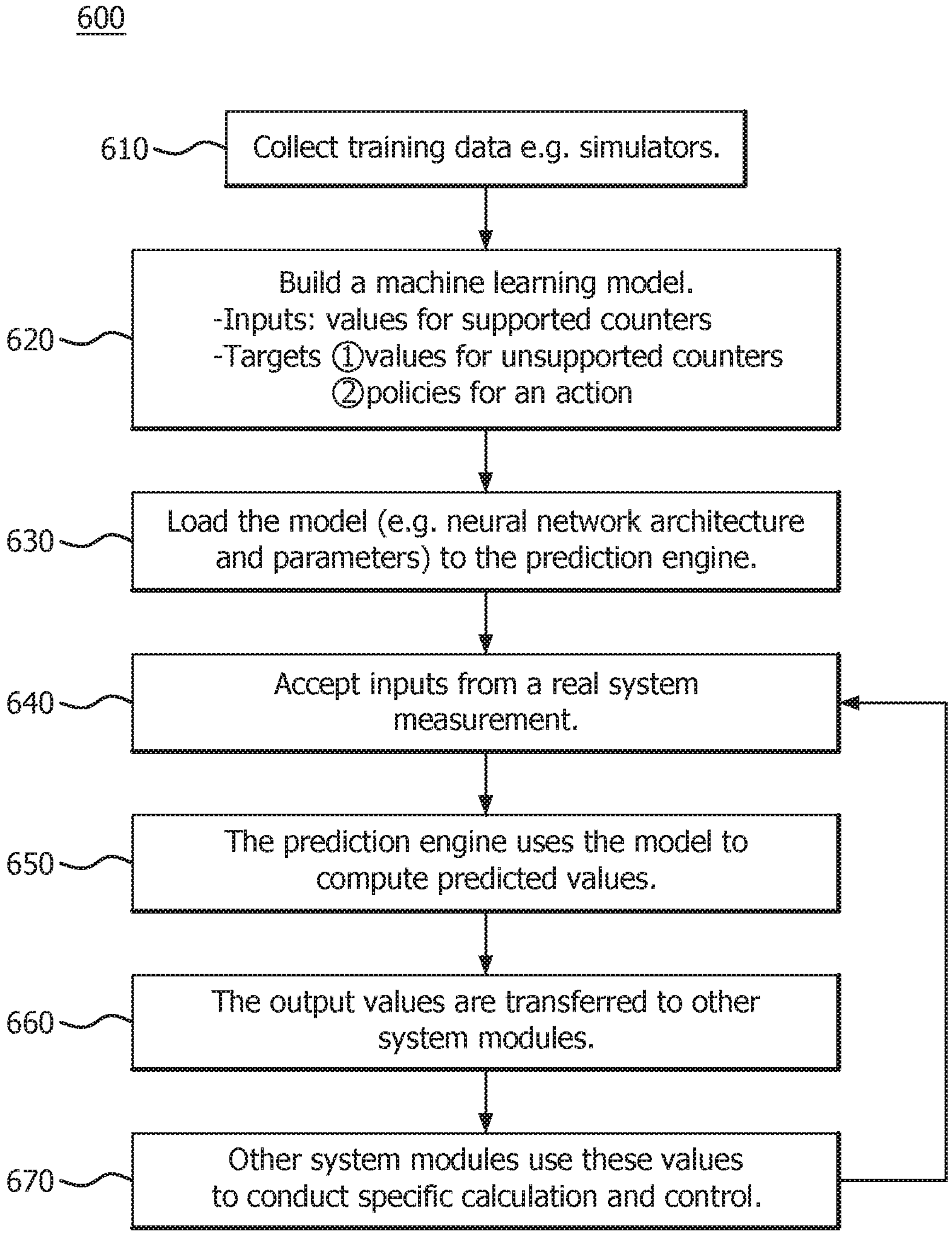
FIG. 6 is a flow chart illustrating an example method for generating a counter engine model.

FIG. 6 is a flow chart which illustrates an example method 600 for generating an example model 310 and operating counter engine 300. In this example, model 310 includes an ANN, however it is noted that other models may be used, including models that do not include an ANN or are not generated using an ANN. Steps 610-630 relate to generation of the model 310, and steps 640-670 relate to operation of the counter engine 300 using the generated model 310. Method 600 is thus a combination of a training method and a derived counter generation method, and these methods can be considered and/or implemented separately.

In step 610, training data is collected, e.g., through simulations. The training data is used to train the model 310. Training data can include a set of inputs to an ANN having a known correct output. For example, a set of inputs can include example hardware counter values, and the set of outputs can include known correct derived counter values corresponding to the example hardware counter values.

In step 620, model 310 is trained using the training data generated in step 610. In this example, the training data is input to the ANN and the output of the ANN is compared with the known correct output. Example known correct outputs can include labels known to correctly correspond to input data samples. If the difference between the output and the known correct output (e.g., the error function) is above a desired threshold, parameters of the ANN (e.g., link weights) are adjusted and step 620 is repeated. Otherwise, the model 310 can be considered as trained. In step 630, the model (e.g., ANN architecture and parameters) are loaded onto counter engine 300.

In step 640, counter engine 300 inputs values from hardware counters 330, and/or inputs 340 during operation of the processor. In step 650, counter engine 300 applies model 310 to the hardware counter values 330, and/or inputs 340 to generate one or more derived counters 350. In step 660, counter engine 300 communicates derived counters 350 to one or more consumers of this information, such as an operating system scheduler 360, memory controller 370, power manager 380, or cache controller 390. In step 670 the consumers (e.g., operating system scheduler 360, memory controller 370, power manager 380, or cache controller 390) use the derived counters 350 to improve operation (e.g., hardware scheduling, memory management, power control, etc.)

It is noted that various steps may be omitted or added. For example, in some implementations the model 310 may be modified dynamically based on output values of the counter engine 300, e.g., at step 660 For example, performance counters can be collected during execution, and ANN training can be performed off-line in parallel. After a new model is trained successfully, the old model can be replaced with the new model. In another example, a plurality of new models can be trained, and the model 310 can be replaced by switching dynamically among the various trained models. In some implementations, model 310 may be replaced, augmented, modified, or updated, for example, via a firmware update, or dynamically using machine learning circuitry or circuitry implementing algorithms for selecting a new model from stored models, or for otherwise replacing, augmenting, modifying, or updating the current model 310. This may occur at step 630, or in an added step. Replacing, augmenting, modifying, or updating the model 310 may be triggered by any suitable event, such as if the model 310 is not efficient for the new workload. Replacing, augmenting, modifying, or updating the model 310 can have the functional advantage of providing additional, alternative, and/or dynamically improved counters to hardware control circuits that would otherwise be limited to a fixed number of hardware performance counters.

Figure 7:
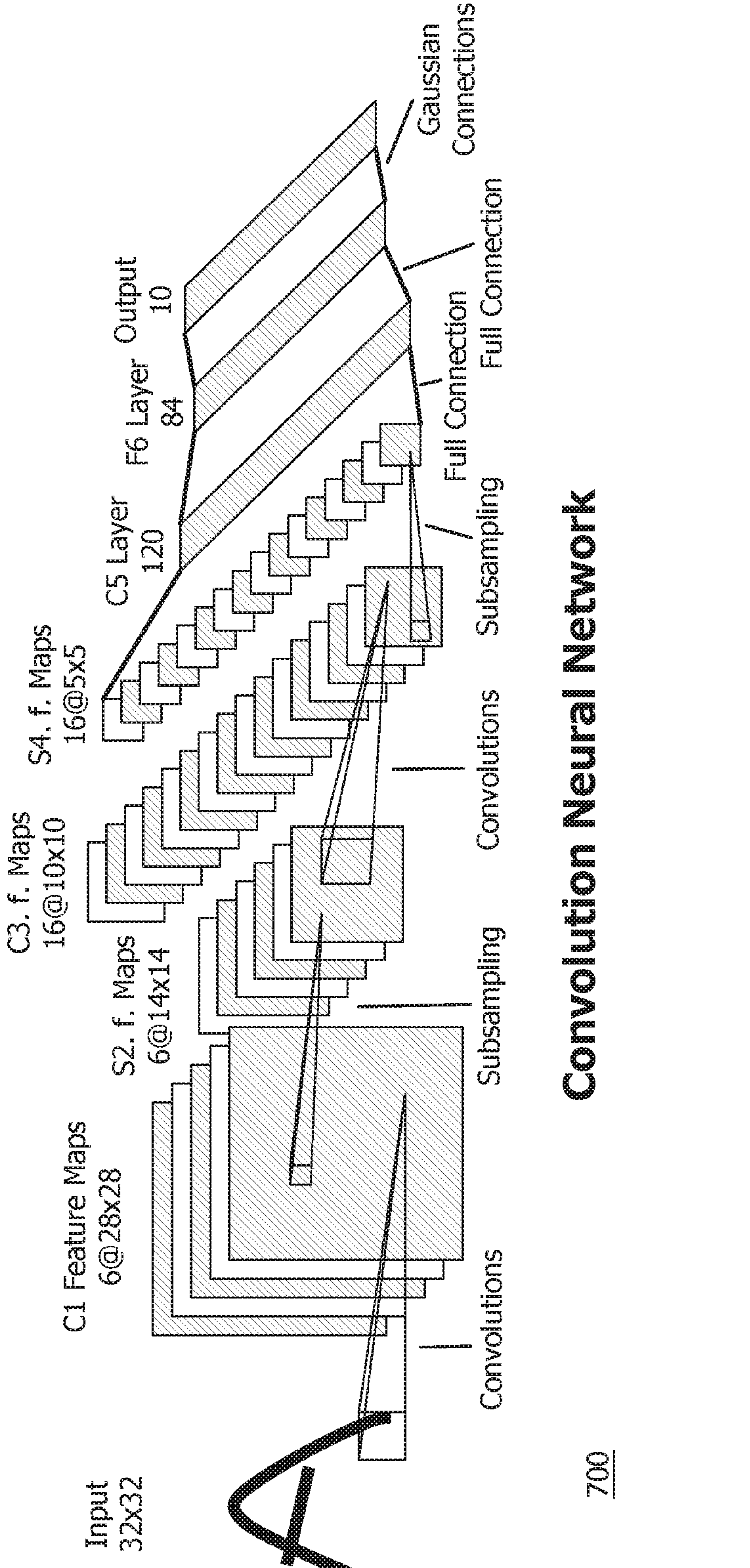
FIG. 7 is a block diagram illustrating an example convolutional neural network (CNN) which can be used as a model for the counter engine of FIG. 3.

Counter engine 300 shown and described with respect to FIG. 3 can include types of ANN other than the fully-connected ANN 400 and ANN 500 shown and described with respect to FIG. 4 and FIG. 5 respectively. For example, counter engine 300 can include a convolutional neural network (CNN), and/or recurrent neural network (RNN). FIG. 7 is a block diagram illustrating an example CNN 700. CNN 700 may include several convolutional layers, several pooling layers, and/or several fully-connected layers. CNN 700 illustrates commonly understood features of a typical CNN, including input and output, feature maps (i.e., the output of a filter applied to a previous layer), subsampling (i.e., subsampling the output of a layer and passing the result to the next layer, e.g., to reduce feature size), convolution (i.e., applying a convolution operation to the output of a layer and passing the result to the next layer), and Gaussian connections (e.g., to measure the cost function of the CNN). CNN 700 exemplifies a type of model which can be used to predict derived counters. For example, model 310 as shown and described with respect to FIG. 3 could include a CNN similar to CNN 700 as shown and described with respect to FIG. 7.

Figure 8:
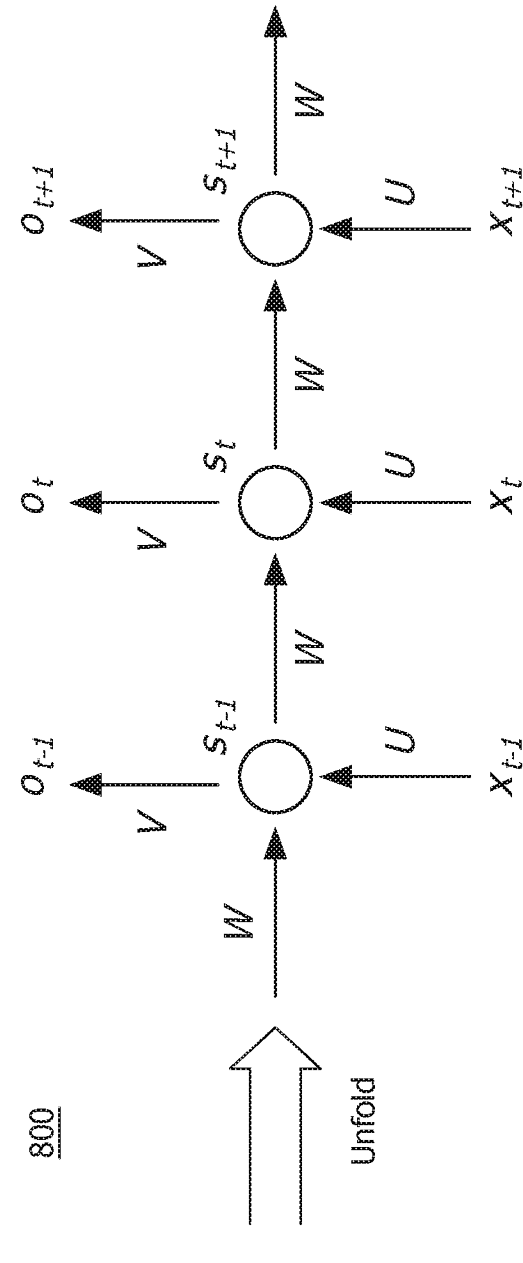
FIG. 8 is a block diagram illustrating an example recurrent neural network (RNN) which can be used as a model for the counter engine of FIG. 3.

FIG. 8 is a schematic diagram illustrating an example RNN 800. RNN 800 includes long short term memory (LSTM) and/or gated recurrent unit (GRU) blocks, e.g., with recurrent edges. RNN 800 exemplifies a type of model which can be used to predict derived counters. For example, model 310 as shown and described with respect to FIG. 3 could include an RNN similar to RNN 800 as shown and described with respect to FIG. 8. RNN 800 illustrates commonly understood features of a typical RNN, including input x, output o, state s, and parameters U, V, and W. FIG. 8 also shows an unfolded view of RNN 800 which illustrates example hidden states $s_{t-1}$, $s_t$, and $s_{t+1}$ and corresponding inputs and outputs for time steps t−1, t, and t+1.

Figure 9:
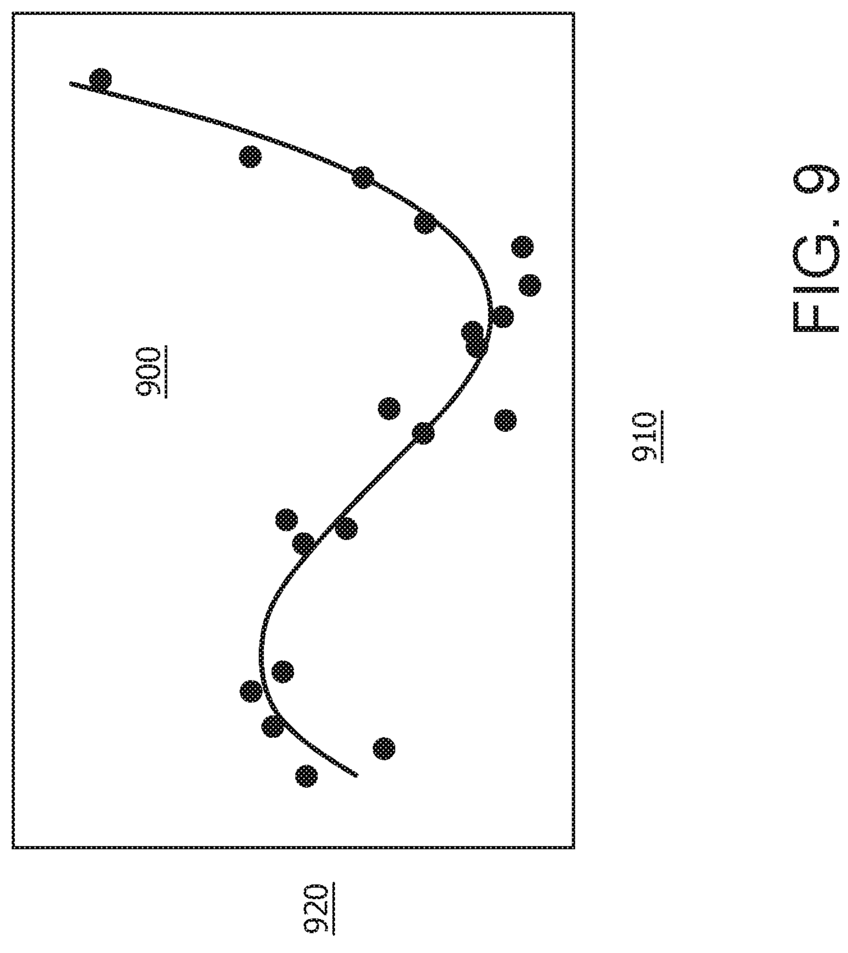
FIG. 9 is a graph illustrating an example nonlinear function which can be used as a model for the counter engine of FIG. 3.

FIG. 9 is a schematic diagram illustrating an example user-defined function 900. User-defined function 900 includes any user-defined relationship between the input to a counter engine and the output of the counter engine (i.e., the desired derived counters). User-defined function 900 is shown as a non-linear relationship between an input hardware counter value 910 and an output derived counter value 920. It is noted however that user-defined functions can include any suitable relationship, such as linear or discontinuous, or may include a larger number of input hardware counter values or output derived counter values, for example. User-defined functions can also be expressed as a lookup table, or using any other suitable representation. User defined functions can be developed using machine learning or can be user generated, e.g., based on empirical observations, theoretical calculations, heuristics, engineering experience, and/or any other suitable source.

For example, user-defined function 900 can be derived from non-ANN techniques, such as regression. A regression model which predicts one or more derived counters can be generated based on implemented hardware counters and/or sensor data. User-defined functions, such as regression models, can be used to predict power consumption, for example. In another example, a counter engine can map an input hardware counter value which tracks each add instruction executed by a processor using a linear user-defined function to generate a derived counter which ticks once for every 64 add instructions executed by the processor.

It is noted that any suitable relation or combination of relations can be specified. User-defined function 900 exemplifies a type of model which can be used to predict derived counters. For example, model 310 as shown and described with respect to FIG. 3 could include a user-defined function similar to user-defined function 900 as shown and described with respect to FIG. 9.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor comprising:

input circuitry configured to input a hardware performance counter value that is obtained while the processor is executing a first portion of an application;

counter engine circuitry configured to determine a derived counter value by applying a model to the hardware performance counter value, wherein:

the derived counter value predicts attributes for the processor while executing a second portion of the application, and the counter engine circuitry comprising an artificial neural network (ANN) configured to dynamically modify the model based on the derived counter value; and output circuitry configured to communicate the derived counter value to a hardware control circuit, wherein the hardware control circuit schedules execution of the second portion of the application based on the derived counter value.

2. The processor of claim 1, wherein the hardware control circuit utilizes an operating system scheduler, a memory controller, a power manager, a data prefetcher, or a cache controller.

3. The processor of claim 1, further comprising circuitry configured to dynamically select a new model from stored models during operation of the processor.

4. The processor of claim 1, wherein the model comprises or is generated by the artificial neural network (ANN).

5. The processor of claim 4, wherein the ANN comprises at least one of a convolutional neural network (CNN), a recurrent neural network (RNN), or a combination of a CNN or an RNN with a fully connected neural network.

6. The processor of claim 1, wherein the model comprises a regression model.

7. The processor of claim 1, wherein the derived counter value indicates a predicted execution time for the second portion of the application.

8. The processor of claim 1, further comprising circuitry configured to determine whether to execute the second portion of the application serially or in parallel based on the derived counter value.

9. The processor of claim 1, further comprising circuitry configured to determine an address for a memory access based on the derived counter value.

10. The processor of claim 1, further comprising circuitry configured to manage power or frequency of the processor based on the derived counter value.

11. A prediction unit implemented on a processor core, the processor core comprising:

input circuitry configured to input a hardware performance counter value that is obtained while the processor is executing a first portion of an application;

counter engine circuitry configured to determine a derived counter value based on applying a model to the hardware performance counter value, wherein:

the derived counter value predicts attributes for the processor while executing a second portion of the application, and the model is trained based on a comparison between exemplary pairs of hardware performance counter values and corresponding derived counter values; and output circuitry configured to communicate the derived counter value to a hardware control circuit, wherein the hardware control circuit schedules execution of the second portion of the application by the processor based on the derived counter value.

12. The prediction unit of claim 11, wherein the hardware control circuit utilizes an operating system scheduler, a memory controller, a power manager, a data prefetcher, or a cache controller.

13. The prediction unit of claim 11, further comprising circuitry configured to dynamically select a new model from stored models during operation of the processor.

14. The prediction unit of claim 11, wherein the model comprises or is generated by an artificial neural network (ANN).

15. The prediction unit of claim 14, wherein the ANN comprises at least one of a convolutional neural network (CNN), a recurrent neural network (RNN), or a combination of a CNN or an RNN with a fully connected neural network.

16. The prediction unit of claim 11, wherein the model comprises a regression model user-defined function.

17. The prediction unit of claim 11, wherein the derived counter value indicates a predicted application performance for the second portion of the application.

18. The prediction unit of claim 11, further comprising circuitry configured to determine whether to execute the second portion of the application serially or in parallel based on the derived counter value.

19. The prediction unit of claim 11, further comprising circuitry configured to determine an address for a memory access based on the derived counter value.

20. The prediction unit of claim 11, further comprising circuitry configured to manage power or frequency of the processor based on the derived counter value.

21. A method comprising:

inputting a hardware performance counter value to a counter engine that is obtained while the processor is executing a first portion of an application;

determining a derived counter value by applying a model to the hardware performance counter value using the counter engine, wherein:

the derived counter value predicts attributes for the processor while executing a second portion of the application, and the model is trained based on a comparison between exemplary pairs of hardware performance counter values and corresponding derived counter values; and communicating the derived counter value to a hardware control circuit, wherein the hardware control circuit schedules execution of the second portion of the application based on the derived counter value.

22. The method of claim 21, wherein the hardware control circuit utilizes an operating system scheduler, a memory controller, a power manager, a data prefetcher, or a cache controller.

23. The method of claim 21, further comprising dynamically changing the model during operation of the processor.

24. The method of claim 21, wherein the model comprises or is generated by an artificial neural network (ANN).

25. The method of claim 24, wherein the ANN comprises at least one of a convolutional neural network (CNN), a recurrent neural network (RNN), or a combination of a CNN or an RNN with a fully connected neural network.

26. The method of claim 21, wherein the model comprises a regression.

27. The method of claim 21, wherein the derived counter value indicates a predicted execution time for the second portion of the application.

28. The method of claim 21, further comprising determining whether to execute the second portion of the application serially or in parallel based on the derived counter value.

29. The method of claim 21, further comprising determining an address for a memory access based on the derived counter value.

30. The method of claim 21, further comprising determining a power or frequency of the processor based on the derived counter value.

31. Instructions stored on a non-transitory computer-readable medium which when executed by a processor cause the processor to perform a method, the method comprising:

inputting a hardware performance counter value to a counter engine that is obtained while the processor is executing a first portion of an application;

determining a derived counter value by applying a model to the hardware performance counter value using the counter engine, wherein:

the derived counter value predicts attributes for the processor while executing a second portion of the application, and the model is trained based on a comparison between exemplary pairs of hardware performance counter values and corresponding derived counter values; and communicating the derived counter value to a hardware control circuit, wherein the hardware control circuit schedules execution of the second portion of the application based on the derived counter value.

32. The instructions of claim 31, wherein the hardware control circuit utilizes an operating system scheduler, a memory controller, a power manager, a data prefetcher, or a cache controller.

33. The instructions of claim 31, wherein the method further comprises dynamically changing the model during operation of the processor.

34. The instructions of claim 31, wherein the model comprises or is generated by an artificial neural network (ANN).

35. The instructions of claim 34, wherein the ANN comprises at least one of a convolutional neural network (CNN), a recurrent neural network (RNN), or a combination of a CNN or an RNN with a fully connected neural network.

36. The instructions of claim 1, wherein the model comprises a regression model.

37. The instructions of claim 31, wherein the derived counter value indicates a predicted execution time for the second portion of the application.

38. The instructions of claim 31, the method further comprising:

determining whether to execute a portion of the second portion of the application serially or in parallel based on the derived counter value.

39. The instructions of claim 31, the method further comprising:

determining an address for a memory access based on the derived counter value.

40. The instructions of claim 31, the method further comprising:

determining a power or frequency of the processor based on the derived counter value.

41. A system comprising:

a processor; and a counter engine communicatively coupled to the processor, wherein the counter engine comprises:

input circuitry configured to input a hardware performance counter value from the processor while the processor is executing a first portion of an application;

counter engine circuitry configured to determine a derived counter value based on applying a model to the hardware performance counter value, wherein;

the derived counter value predicts attributes for the processor while executing a second portion of the application, and the model is trained based on a comparison between exemplary pairs of hardware performance counter values and corresponding derived counter values; and output circuitry configured to communicate the derived counter value to a hardware control circuit of the processor, wherein the hardware control circuit schedules execution of the second portion of the application based on the derived counter value.

42. The system of claim 41, wherein the hardware control circuit utilizes an operating system scheduler, a memory controller, a power manager, a data prefetcher, or a cache controller.

43. The system of claim 41, wherein the model comprises or is generated by an artificial neural network (ANN).

44. The system of claim 41, wherein the derived counter value indicates a predicted execution time for the second portion of the application.

45. The system of claim 41, wherein the counter engine is disposed on the processor.

46. The processor of claim 1, wherein the derived counter value predicts a predicted memory address.

47. The processor of claim 1, wherein the derived counter value predicts a predicted power requirement.

48. The processor of claim 1, wherein the derived counter value predicts a predicted frequency requirement.

* * * * *